United States Patent [19]

Fabris et al.

[11] Patent Number: 5,071,202
[45] Date of Patent: Dec. 10, 1991

[54] CAM MODULATOR FOR ANTI-LOCK BRAKING SYSTEM APPARATUS AND METHOD

[75] Inventors: Alroy G. Fabris, Mt. Clemens; Frank G. Pirrallo, Troy; Guruswamy Umasankar, Sterling Heights; Bruce S. Shimanovski, Southfield; Prakash C. Shrivastava, Troy, all of Mich.

[73] Assignee: General Motors Corporation, Detroit, Mich.

[21] Appl. No.: 572,307

[22] Filed: Aug. 27, 1990

Related U.S. Application Data

[63] Continuation of Ser. No. 341,986, Apr. 24, 1989, abandoned.

[51] Int. Cl.[5] .................................................. B60T 8/42
[52] U.S. Cl. ............................ 303/115 EC; 303/113 R
[58] Field of Search ........................... 303/115, 119, 61

[56] References Cited

U.S. PATENT DOCUMENTS

| | | | |
|---|---|---|---|
| 2,270,586 | 1/1942 | Jahant et al. | 188/152 |
| 3,467,441 | 9/1969 | Clark et al. | 303/115 |
| 3,747,990 | 7/1973 | Tanguy | 303/115 X |
| 3,942,843 | 3/1976 | Tobiasz | 303/61 |
| 3,942,843 | 3/1976 | Tobiasz | 303/115 |
| 4,715,665 | 12/1987 | Ostwald | 303/115 |
| 4,775,196 | 10/1988 | Braschel et al. | 303/115 |
| 4,822,114 | 4/1989 | Klein | 303/115 |
| 4,957,330 | 9/1990 | Morikawa et al. | 303/115 |

FOREIGN PATENT DOCUMENTS 2202018 9/1988 United Kingdom .

Primary Examiner—Robert J. Oberleitner
Assistant Examiner—Lee W. Young
Attorney, Agent, or Firm—Ernest E. Helms

[57] ABSTRACT

An anti-lock braking system system (ABBS) pressure modulator is provided. The modulator includes a frame with a central bore fluidly exposed to a solenoid valve and to a vehicle wheel cylinder. A piston is slidably mounted within the central bore having a contact surface and a first predetermined position within the bore. A power device is actuated by a controller. A cam, moved by the power means, has a ramp surface in contact with the piston contact surface. The position of the piston within the wheel cylinder is determined by the position of the cam.

7 Claims, 6 Drawing Sheets

CAM PROFILE 5,071,202

CAM MODULATOR FOR ANTI-LOCK BRAKING SYSTEM APPARATUS AND METHOD

This is a continuation of U.S. Pat. application Ser. No. 07/341,986 filed on April 24, 1989, now abandoned.

FIELD OF THE INVENTION

The field of the present invention is that of a pressure modulator for an anti-lock braking system (ABS) apparatus and method of utilization thereof.

DISCLOSURE STATEMENT

Anti-lock braking system typically in operation automatically control the fluid pressure of the brake fluid supplied to a wheel brake to prevent the brake from locking up or skidding on the pavement therefore maximizing the stopping capabilities of a vehicle while allowing maximum maneuverability of the vehicle Most anti-lock braking systems have a wheel speed sensor which provides an input to a computer The controller supplies a signal to an isolation valve which cuts off the master cylinder from the wheel cylinder when ABS operation is required. A pressure modulator of some type then takes over and in response to the signals given by the ABS system controller applies, holds or decreases the pressure supplied to the brake. Anti-lock braking system modulators are shown and described in U.S. Pat. Nos. 4,653,815 and 4,756,391, commonly assigned The present invention provides an anti-lock braking system modulator which provides an alternative to the aforementioned patents.

SUMMARY OF THE INVENTION

The present invention provides a cam actuated anti-lock braking system modulator apparatus and method of utilization thereof In a preferred embodiment, a cam allows the actuator to have a variable relationship between the torque of the modulator motor and the pressure output. The cam profile minimizes the motor torque required to reach a desired braking system pressure and also substantially monotonically increases the torque with rotation from bottom to top dead center positions. additionally, the cam is configured in such a manner that there is a stop member to set the position of the modulator piston in its bottom dead center location The cam is also configured so that at the top dead center position the piston exerts a force which goes through the pivotal axis of the cam, thereby preventing the piston from being back driven when the motor is cut off.

It is an object of the present invention to provide an apparatus and method of utilization thereof of an ABS pressure modulator It is an object of the present invention to provide a check valve for an ABS actuator.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
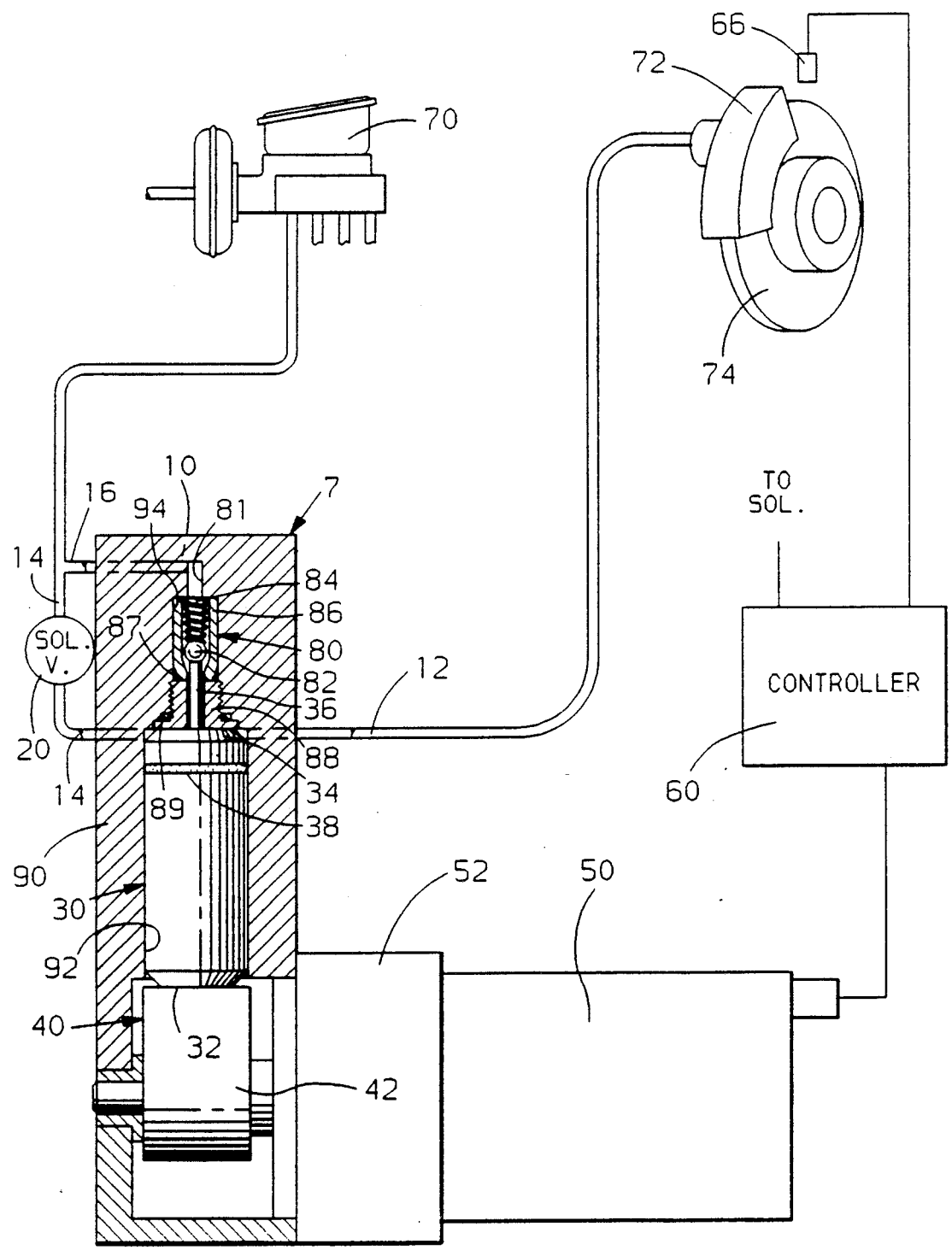
FIG. 1 is a sectional view shown partially in side elevation of a preferred embodiment ABS pressure modulator according to the present invention.
Figures 2, 3:
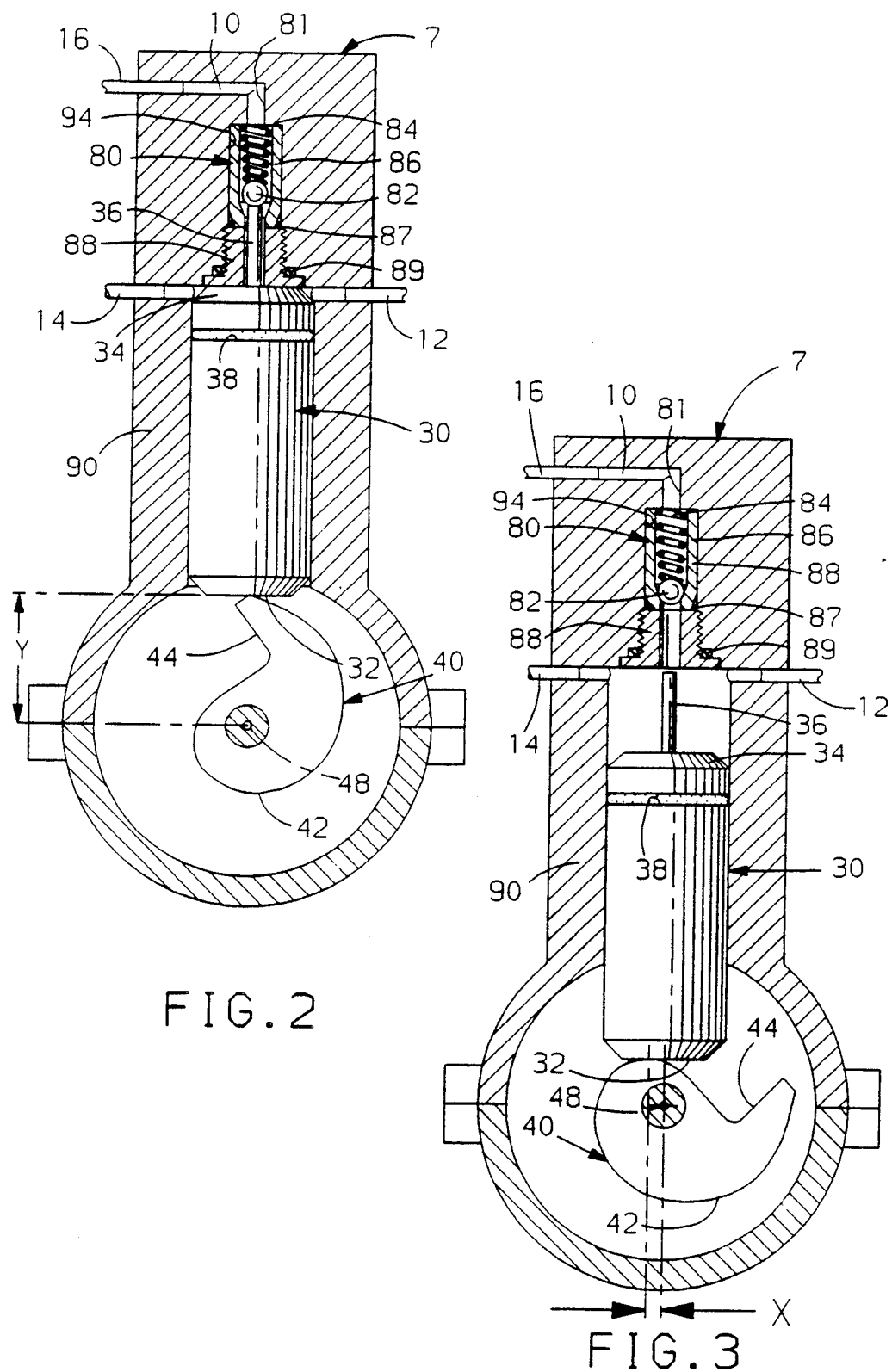
FIGS. 2-4 are sectional views taken generally perpendicular to the view illustrated in FIG. 1 illustrating the operation of the modulator illustrated in FIG. 1.

As illustrated in FIG. 1 the ABS pressure modulator 7 has a frame 90 with a central bore 92. The modulator has a fluid connection 16 with a master cylinder 70. The modulator 7 also has a fluid connection 12 with a brake cylinder (or caliper) 72. An internally mounted solenoid valve 20 is connected in parallel with connecting 12 and 16 via a branch 14 with the central bore 92. If desired, solenoid valve 20 can be mounted externally to the modulator frame 90. A controller 60 regulates the operation of the solenoid valve 20. (NOTE: For clarity of illustration the connections 12, 16 and branch 14 are shown 90 degrees from their true positions as shown in FIGS. 2 and 3 and are therefore illustrated in phantom).

The central bore 92 is fluidly exposed to the master cylinder connection 16 via a check valve means 80 and by the solenoid valve 20 via the branch 14. In a similar manner the central bore 92 is fluidly exposed to the brake cylinder 72 via fluid connection 12. Mounted within the central bore 92 is a sliding piston 30. The piston 30 has a stem 36 projecting from a head 34 Closely adjacent to the piston head 34 is an annular groove 38 for an 0-ring seal.

The piston is usually fabricated from a material compatible with the aluminum modulator frame 90 and has a hardened central surface 32 In an alternative embodiment (FIG. 11) the contact surface 32 is a roller 132 rotatively mounted to the piston 30.

The check valve 80 has an orifice 81 connected with the fluid connection 10. A spring 84 biases a check ball 82 downward The spring 84 and the ball 82 are mounted within an insert 86 which also has an internally tapered bore which forms a valve seat for the ball 82.

The insert 86 is held within a bore 94 of the frame 90 by a threaded hollow plug 88. An 0-ring 87 (FIG. 2) surrounding insert 86 and an 0-ring 89 seal the check valve 80 against leakage.

A check valve opening means is provided by a stem 36 connected with the piston 30. When the piston 30 is at a second predetermined position with the piston head 34 contact or closely adjacent to the plug 88 the stem 36 will contact and unseat the ball 82 allowing flow from the master cylinder 70 to the wheel cylinder 72 and vice versa.

To determine the position of the piston 30 within the central bore 92 there is provided rotary cam 40. The cam 40 has a ramp surface 42 and a stop surface 44. At the top dead center position shown in FIG. 2 the piston head 34 contacts the plug 88. The piston head 34 (or plug 88) has a transverse surface groove (not shown) to allow flow past the check valve 80 to the wheel cylinder 72 when the braking system is in the normal mode of operation.

The cam 40 is moved by a reversible motor 50 via gear box 52. The gear box has an approximate ratio of 60 motor 1 rotation cam. The motor 50 (usually D.C.) is controlled by the controller 60.

In the normal mode of operation or normal braking, the brake fluid pressure at the master cylinder 70 causes the wheel cylinder 72 to actuate and apply a braking force to a vehicle wheel 74 through the normally open solenoid valve 20 as well as through the check valve 80 which is held open by the stem 36 which is attached to the top of the piston 30.

The piston 30 is held in the second predetermined extreme position (in the instance shown located at the top dead center position), against the pressure force of the fluid in the brake system, without any power being supplied to the geared motor 50. The cam profile near the top dead center is such that the line of action of the piston force on the cam 40, caused by the brake pressure acting on the piston 30, passes through the center of rotation 48 of the cam 40. Therefore, there is no resultant torque on the cam 40. Therefore, no holding torque is required, thus the motor 50 does not need an electro-magnetic or other type of brake when the modulator 7 is in the normal braking mode A sensor 66 determines wheel speed and informs the controller 60. Controller 60 by a method explained in U.S. Pat. No. 4,673,225 or by another when appropriate will commence on As$ mode of operation. The ABS mode of operation is initiated when a wheel lock condition is detected by the wheel speed sensor 66.

The ABS mode of operation starts with a "dump" cycle. The normally open solenoid valve 20 is closed. The motor 50 is actuated causing the cam 40 to turn and the piston 30 to retract The retractive motion of piston 30 causes the check valve 80 to shut off and isolates the wheel cylinder 72 from the master cylinder 70.

The motor 50 continues to rotate moving the piston 30 down. The brake fluid pressure in the wheel cylinder 72 and the braking force drop steadily The controller 60 detects the end of wheel lock condition using the wheel speed sensor 66 and reverses the direction of the motor 50.

Now the "apply" cycle starts. The piston 30 starts to move up increasing the brake fluid pressure in the wheel cylinder 72 and the braking force until wheel lock is detected again. The controller 60 stores the value of the motor current at which this wheel lock happened and initiates the "dump" cycle.

The motor 50 is reversed and the "dump" cycle starts again. The "dump" cycle ends at the end of the wheel lock condition and then a new "apply" cycle starts.

During the "apply" cycle the current of the motor is limited by the controller 60 to the previously stored value unless a wheel lock condition is detected earlier If no wheel lock occurs at the previously stored motor 50 current value, the current is increased in steps by the controller 60 until wheel lock happens again. The controller 60 stores this new value of the motor 50 current and initiates the next "dump" cycle.

Figure 9:
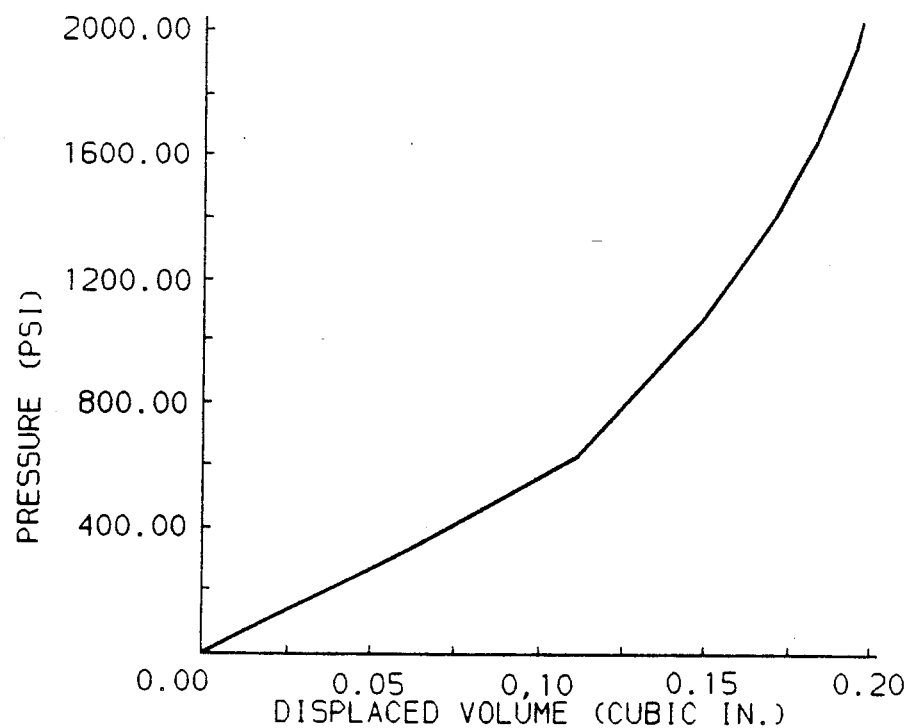
FIG. 9 illustrates the relationship between brake system pressure and displacement volume of the piston.

The controller 60 uses the wheel speed sensor 66 and motor 50 current as inputs to control the brake pressure. The relationship between the motor 50 current and the brake pressure is therefore a critical characteristic of the modulator 7. The cam 40 shown is designed to closely match the control algorithm in U.S. Pat. No. 4,673,225 and the pressure vs. volume profile (see FIG. 9) of the car brake caliper for optimal performance of the ABS system.

Figure 7:
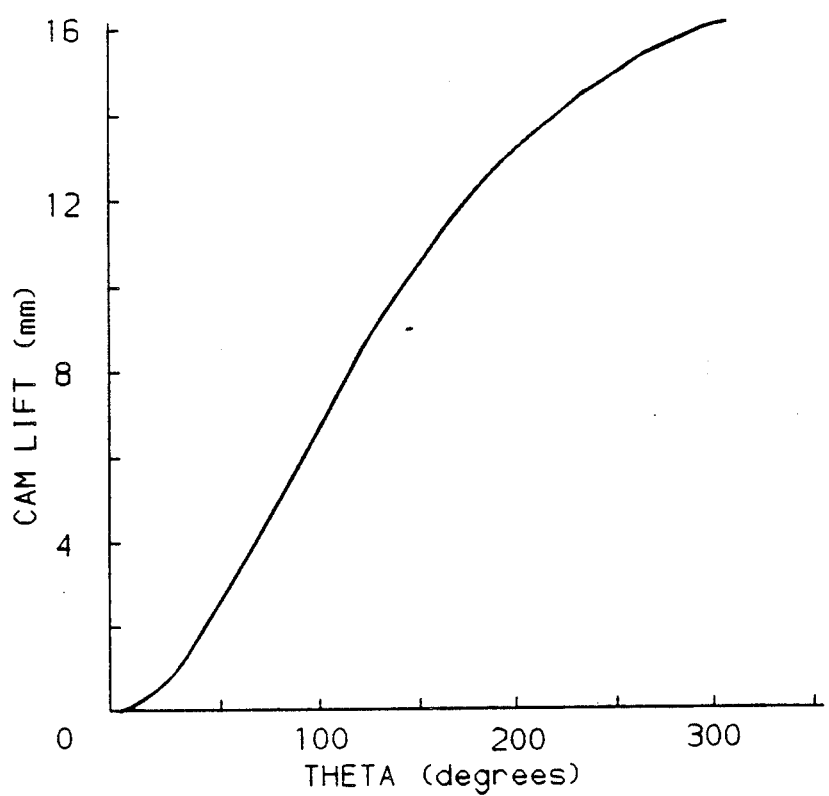
FIG. 7 illustrates the relationship between piston travel and angular rotation of the cam.
Figure 8:
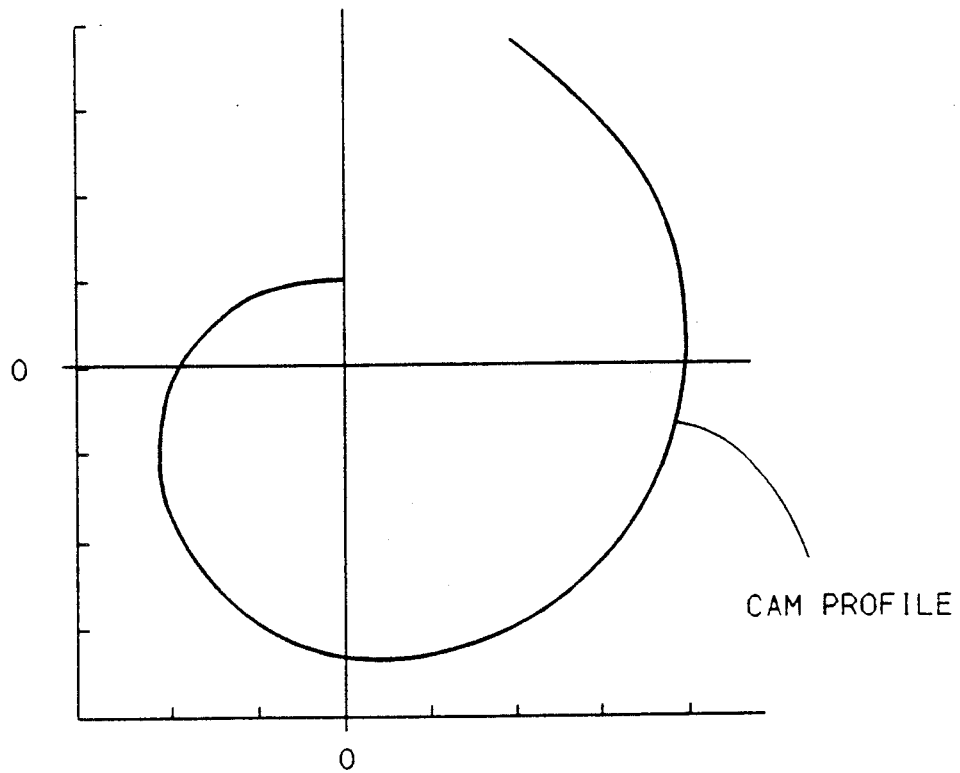
FIG. 8 illustrates the profile of the cam.
Figure 12:
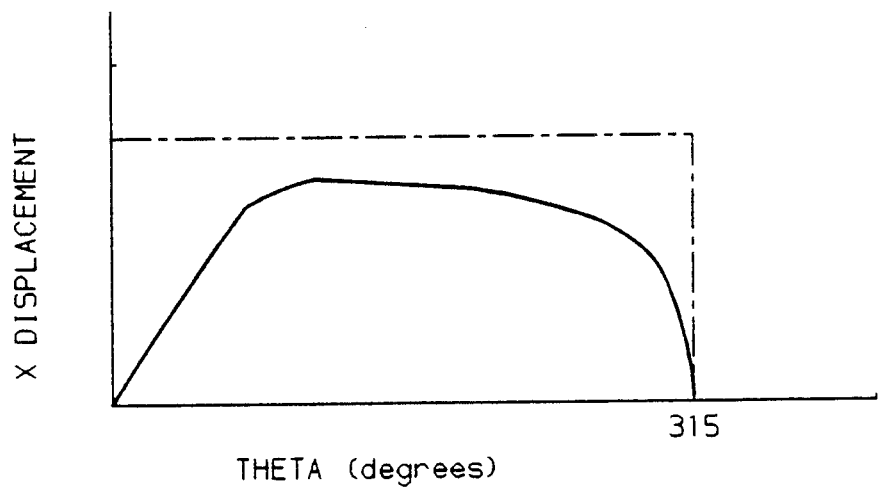
FIG. 12 illustrates the relationship between rotation of the cam and "X" displacement of the cam with the piston contact surface.

The profile (FIG. 8) of the cam contact surface 42 is such that the lift (FIG. 7) of the cam follower (piston 30) is aggressive in the initial stages of the profile (at a first predetermined position near the BDC of the piston). The profile becomes less aggressive in the later stages of the profile (near the TDC of the piston) and progressing toward a "zero-lift" condition at the TDC. The "X" displacement (FIG. 12) will be at zero at this point. The above presents the following critical features over previous linear action ABS modulators (1) Better pressure "apply" and "dump" performance at lower brake pressures due to a high rise initial profile (low mechanical ratio). There is also higher sensitivity to brake pressure in this region of the profile which makes the system more controllable at lower pressures; (2) Lower torque requirements at higher brake pressures due to less aggressive profile near the TDC of the piston; (3) No torque on the cam under normal braking conditions when ABS is not used due to the "zero-lift" profile at the TDC of the piston. Therefore, a brake (typically an electro-magnetic) will not be required to hold the cam 40 at the TDC position Alternatively any brake could be smaller than previously required.

Figure 4:
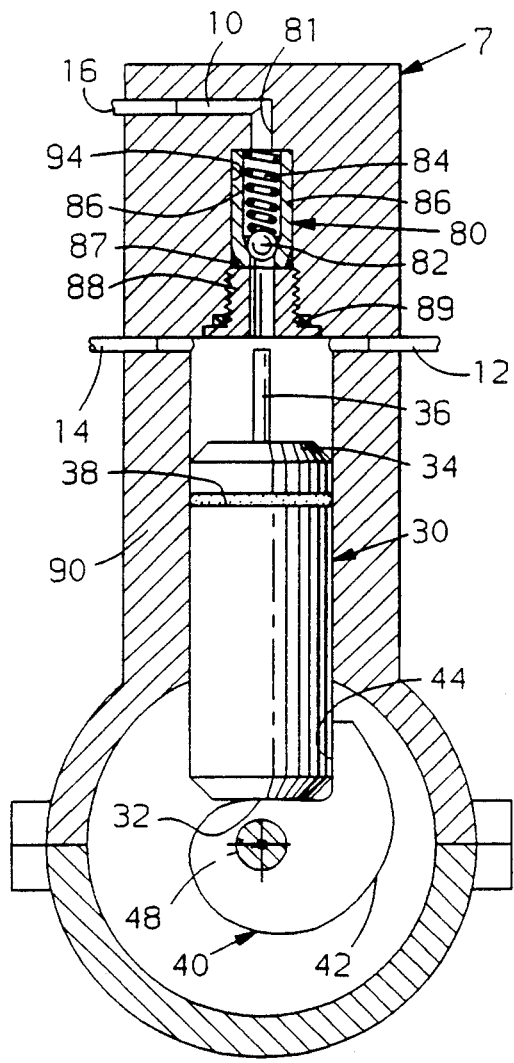

Additionally, when the piston is at BDC (FIG. 4), surface 44 of the cam provide a stop surface, causing the piston 30 to prevent any further reverse travel of the cam by causing a torque spike in the motor 50. The torque spike is sensed and utilized by the controller 60 that the piston 30 is at BDC.

The cam 40 comes up against positive stops against the piston 30 at either end of the piston travel. There is no chance of any wedging of the piston 30 within the central bore 92. Spring packs within the central bore 92 to prevent possible wedging of the piston 30 are eliminated. The cam contact surface 42 profile offers the opportunity to vary the mechanical ratio over different ranges of the stroke. The profile is designed such that with a low mechanical ratio at the lower ranges of the piston stroke where the brake pressures are lower and with a high mechanical ratio at the upper ranges of the piston stroke where the brake pressures are higher. The present cam profile offers several advantages. There is better performance (higher psi/sec "dump" and "apply" rates) due to higher piston 30 speeds at low brake pressures i.e. better brake apply and dump rates when braking on low friction surfaces (icy and wet pavements) where the ABS system Will be used the most. There are relatively low peak torque requirements to actuate the piston 30 due to the high mechanical ratio at higher brake pressures. The above results in lower peak current draw on the car's electrical system and lower cost of power electronics. Alternatively the advantage can be expressed that by matching the cam profile 42 to the pressure volume characteristics of the brake cylinder 72, the torque of the motor 50 for a given pressure output is minimized.

The relationship between the brake pressure and the motor torque (current) is nonlinear by virtue of the cam profile design. The motor current is more sensitive to brake pressure at lower ranges of the piston stroke (lower pressures) and is less sensitive to the brake pressure at higher ranges of the piston stroke (higher pressures). This characteristic better matches the control algorithm (U.S. Pat. No. 4,673,225 awarded to GM In June 1987) and provides optimum system performance.

Figure 10:
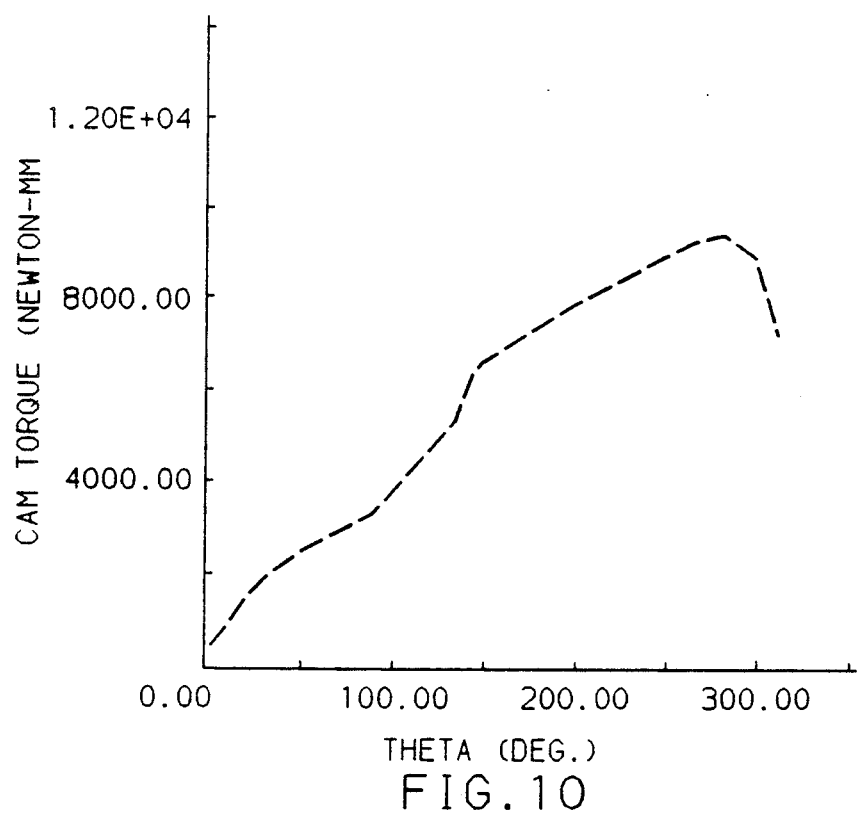
FIG. 10 illustrates the relationship between rotation of the cam and pressure.

The cam 40 is profiled in such a manner that the torque required from the motor 50 to rotate the cam 40 from BDC to TDC is monotonically increasing (FIG. 10) substantially all of the stroke of the cam 40 from BDC to TDC. As best shown in FIG. 10, the torque rises from approximately 0° (BDC) to a peak torque at approximately 280° in a total rotation of approximately 315°.

The cam modulator 7 design is modular. Each module is put together as a sub-assembly (e.g. geared motor, housing) and then the sub-assemblies are assembled together. Thus, the manufacturing and assembly processes are simpler.

Figure 11:
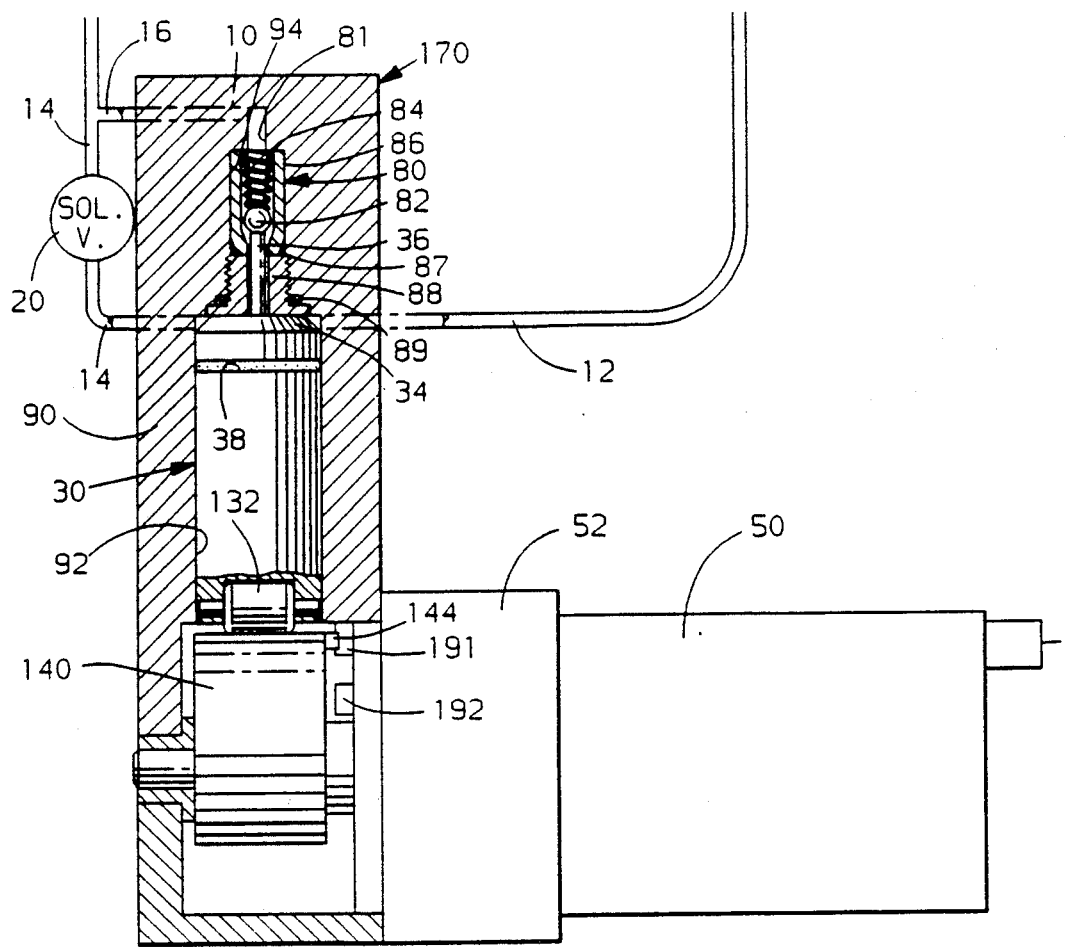
FIG. 11 illustrates an alternate preferred embodiment of the present invention.

Referring to FIG. 11, an alternate preferred embodiment actuator 170 has a roller 132 contact surface on the end of the piston. The cam 140 has a lateral projecting boss stop 144 which makes contact at TDC and BDC with stops 191, 192 of the frame.

Figure 5:
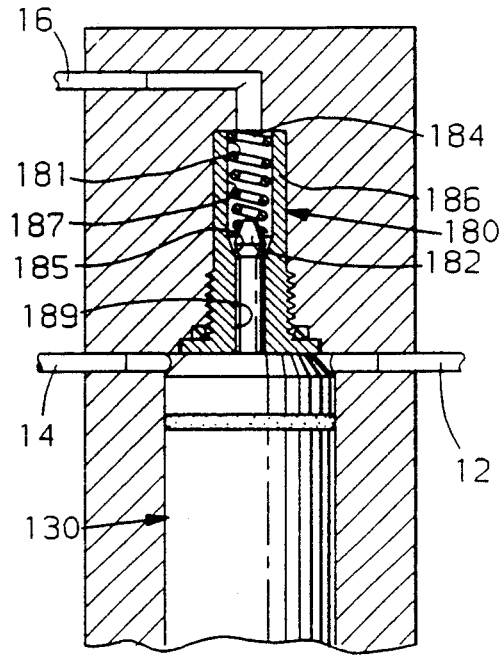
FIGS. 5 and 6 are sectional cutoff views illustrating an alternative embodiment check valve utilized in the environment of the modulator of FIG. 1.
Figure 6:
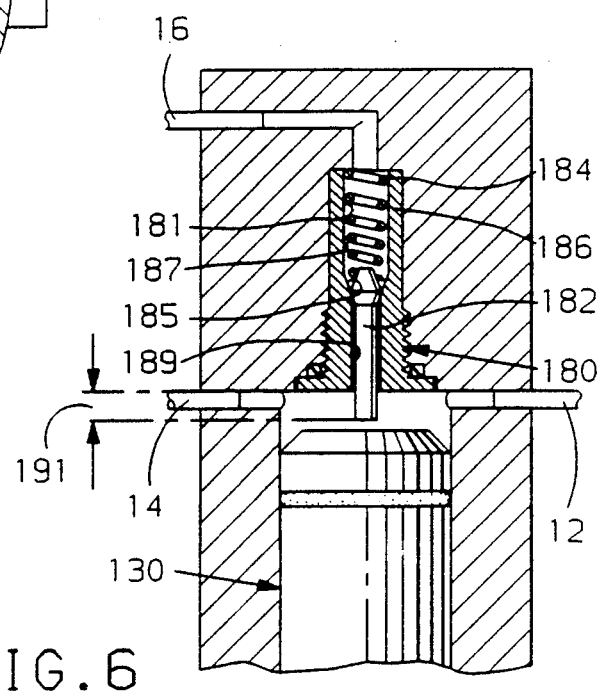

Referring to FIGS. 5 and 6, an alternative check valve is provided. The previous plug 88 and insert 86 combined into a one piece insert 186. The stem 36 is removed from the piston 30 and is combined with the ball 82 into the valve member 182. The 0-ring 87 is eliminated. The new check valve besides being simple is easier to fabricate. The distance of the ball 92 from the piston 30 at TDC is no longer critical The over all length of the plug 88 and also of its shoulder and the depth relation of the multiple bores that inserts 86 and plug 88 fit within are no longer as critical Additionally, the length of stem 36 is no longer critical The major if not sole critical detailed dimension left is the length that valve member 182 protrudes from the bottom of the check valve 180. The dimension will determine the dump response time and can be modified for the desired application.

The insert 186 has a central bore 181. The insert central bore 181 has a conical valve seat which also provides an orifice 185. Valve seat 185 divides the insert central bore 181 into an upper first portion 187 and a lower portion 189. Contact of the piston 130 with the stem of spring 184 biased valve member 180 will occur in the positional range of 191 to allow fluid communication between the master cylinder 70 and the brake cylinder 72.

It will be apparent to those skilled in the art that non cam actuated ABS modulators can also utilize the inventive check valve 180.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An anti-lock braking system (ABS) pressure modulator to a braking system with a predetermined pressure versus volume relationship with fluid connections for a wheel cylinder, said modulator being responsive to a fluid pressure controller, said modulator in combination comprising:
   a frame having a central bore fluidly exposed to said wheel cylinder connection;
   a piston slidably mounted within said central bore having a contact surface and said piston having a first predetermined position within said central bore;
   power means actuated by said controller;
   a rotary cam moved by said power means having a ramp surface in contact with said piston contact surface and said cam having a stop surface and whereby the position of said piston within said wheel cylinder is determined by the position of said cam and whereby said cam stop surface determines said first predetermined position of said piston within said bore and causes said power means to signal said controller that said piston is at said first predetermined position and wherein said cam is profiled to monotonically increase the required torque of said power means with rotation of said cam substantially along all of the rotation of said cam from said first position to opposite second position when said actuator is pressurizing the fluid within said wheel brake.

2. A modulator as described in claim 1 wherein said central bore is also fluidly connected through a check valve with said master cylinder and wherein sand modulator has check valve opening means to allow fluid communication between said master cylinder and said central bore via said check valve when said piston is at a second extreme position opposite said first extreme position.

3. A pressure modulator as described in claim 1 further including said piston having rotatably connected thereto a roller providing the contact surface for said cam.

4. A modulator as described in claim 1 wherein said cam when positioning said piston at said second position opposite said first predetermined position. said cam contacts said piston in such a manner that the force of said piston acting on said cam acts through the pivotal center line of said cam.

5. An anti-lock braking system (ABS) pressure modulator for a braking system with a predetermined pressure versus volume relationship said pressure modulator having connections for a wheel cylinder and a master cylinder and a solenoid valve connected in parallel with said connections for a master cylinder and a wheel cylinder, and said solenoid valve being controlled by a fluid pressure controller said modulator being responsive to said fluid controller, said modulator in combination comprising:
   a frame having a central bore fluidly exposed to said master cylinder, and wheel cylinder connections;
   a piston slidably mounted within said central bore having a contact surface and said piston having a first predetermined extreme position with said bore and a second predetermined extreme position within said bore opposite said first predetermined position;
   check valve means within said central bore between said master cylinder and said wheel cylinder connections;
   check valve opening means opening said check valve when said piston is in said second predetermined position;
   power means actuated by said controller; and
   a cam mounted along a rotary axis moved by said power means having a ramp surface in contact with said piston contact surface and said cam having a stop surface whereby the position of said piston within said frame is determined by the position of said cam and whereby at said second predetermined position the force exerted by said piston on said cam is aligned with said piston rotational axis and whereby in the first position said cam stop surface determines the position of said piston and causes said power means signal said controller that said piston is at said first predetermined position and wherein said cam is profiled to monotonically increase the required torque of said power means with rotation of said cam substantially along all of the rotation of said cam from said first position to said second position when said actuator is pressurizing the fluid within said wheel brake.

6. A modulator as described in claim 5 wherein said check valve means is a spring loaded valve mounted within said central bore and biased away from said master cylinder having a check valve plunger mated with a seat, and said check valve plunger having a stem contacted by said piston when said piston is in said second predetermined position to allow fluid communication between said master cylinder and said wheel cylinder through said central bore.

7. A method of modulating the pressure in an antilock braking system (ABS) with a modulator with fluid connections to a wheel cylinder and to a master cylinder via a solenoid valve, said modulator being responsive to a signal given by a fluid pressure controller, said method in combination comprising:
fluidly exposing a frame with a central bore to the solenoid valve and said wheel cylinder connections;
slidably mounting with said central bore a piston having a contact surface and a first predetermined position;
contacting said piston with a rotary cam having a stop surface and a ramp surface with a profile providing monotonically increasing torque requirement with increasing pressure within said bore; and
powering said cam in response to a signal of said controller, whereby said cam stop surface makes contact with a stop and said controller is signaled that said piston is in a first predetermined position.

* * * * *